April 21, 1959 G. S. KNOX 2,883,146
RETRACTABLE SEAL VALVE
Filed April 29, 1957 2 Sheets-Sheet 1

GRANVILLE S. KNOX
INVENTOR.

BY *[signature]*

ATTORNEY

April 21, 1959 G. S. KNOX 2,883,146
RETRACTABLE SEAL VALVE
Filed April 29, 1957 2 Sheets-Sheet 2

GRANVILLE S. KNOX
INVENTOR.

BY

ATTORNEY

United States Patent Office 2,883,146
Patented Apr. 21, 1959

2,883,146

RETRACTABLE SEAL VALVE

Granville S. Knox, Glendale, Calif., assignor to Hydril Company, Los Angeles, Calif., a corporation of Ohio Application April 29, 1957, Serial No. 655,610

17 Claims. (Cl. 251—159)

This invention relates generally to valves, and more particularly has to do with improvements in rubber or plastic sealed plug valves wherein the sealing function is automatically controlled during movement of the valve stopper or plug so as to release the seal during stopper displacement, thereby minimizing any resistance to plug movement, all without sacrificing the positive sealing capacity of the valve automatically effective at selected positions of plug rotation.

From the standpoint of simple and reliable operation of a plug valve incorporating packing material for sealing off between the movable plug or stopper and the fixed valve body, it is found that for maximum effectiveness and uniformity of sealing pressure distribution the packing should be bodily displaceable into and out of sealing engagement with both the plug and portions of the valve body, the packing preferably being formed of a relatively rigid internally tenacious material such as molded rubber, or tetrafluoroethylene, and being closely confined by metal parts when relatively great fluid pressure is exerted thereon to minimize any tendency of the material to extrude out between adjacently relatively movable metal parts.

More importantly, the packing should be bodily displaced completely out of engagement with certain portions of the valve body and plug during movement of the plug into and out of valve open and closed positions, so that the packing will be effectively out of the path of relative movement as between the stopper and valve body and therefore not subject to unnecessary frictional wearing away. Also, it is desirable that the sealing action be automatically initiated as the manual control for the plug stopper is moved to open or closed positions, or both, and with as little complication as possible as respects the number of interacting parts required to establish the seal.

Another important consideration concerns the ability of a valve to be closed while there is a high velocity flow of liquid or gas passing through. Under such conditions, when the valve stopper is very nearly closed and the fluid flow therethrough is highly restricted, the pressure on one side of the valve is high and the pressure on the other side is low. This condition produces zones of high differential pressure within the body of the valve, the effect of which in valves employing rubber or plastic sealing elements, is to cause or tend to cause displacement or extrusion of the plastic sealing medium from a high pressure zone into a low pressure zone. The extent of extrusion, with given pressure differential and given time of exposure to that differential pressure, will, of course, depend upon such considerations as the flow characteristics of the plastic material, the location of the material and means provided for anchoring or retaining the plastic material within a rigid enclosure.

Any appreciable extrusion of the plastic sealing medium may cause the pressure sealing characteristics of the valve to become ineffectual for there is generally no way of restoring the extruded material to its original condition. The effect of even relatively slight extrusion of the plastic material may be damaging since continued movement of the stopper to the fully closed position would shear or scrape off some of the sealing material, and even though the initial loss might be slight, subsequent closures, resulting in loss of additional material, would eventually render the rubber or plastic sealing element ineffectual.

The situation is complicated by the fact that, in a given valve, a zone of relatively high pressure will become a zone of relatively low pressure when high velocity flow through the valve is in the opposite direction. Accordingly, to adapt a valve for universal application, the structure should preferably be so fashioned that harmful simultaneous exposure of the plastic material to differential pressure zones is prevented irrespective of the direction of fluid flow.

The foregoing discussion deals with the problems encountered when rubber or plastic sealed valves are closed against high velocity fluid flow. In general, the same or similar problems are encountered when rubber or plastic sealed valves are opened under conditions of high differential pressures.

It is therefore a major object of the invention to provide a valve of the plastic sealed type wherein the sealing element is moved out of contact with the stopper and to a position where it will not be subjected to wear or exposed to differential pressure conditions at times when such exposure might subject it to damaging extrusion and subsequent shearing action.

The present novel valve succeeds in carrying into practice all of the desirable features and advantages discussed above, through the provision in a valve assembly comprising a chamber forming means and a stopper movable therein, of spring urged packing material normally sealing off between the stopper and the chamber means when the stopper is in valve open or closed positions with respect to a flow passage leading into the chamber, and other means operable to bodily move the packing out of sealing condition in response to stopper displacement from that position. In particular, a packing actuator is displaceable away from the stopper plug by a cam rotatable with the plug to carry the packing bodily out of sealing condition, and against the action of a return spring, which for sealing purposes urges the retainer and packing back toward the plug when the latter is in valve open or closed positions, or both.

Further, the interaction of the cam and return spring on the packing actuator, preferably guided for movement by the chamber forming means, is relatively frictionless as a result of accessibility thereto of fluid in the valve chamber during stopper rotation, and the design is such that there is no need for preventing fluid contact with the packing actuator. Also, the packing itself is substantially confined by the plug, valve body and actuator during establishment of the seal in valve open and closed condition, minimizing every tendency of the packing to extrude out of position under great pressure. Such inadvertent extrusion is additionally made difficult by providing relatively stiff packing material such as relatively rigid molded rubber or tetrafluoroethylene, the preferred packing configuration being annular.

The invention provides for self-energization of the packing annulus to sealing condition by inducing forced radial expansion thereof below the yield point of the material in response to bodily displacement thereof away from the stopper, so that relief of the expanding force during valve open and closed position is accompanied by return of the resilient packing to sealing condition, aided of course by the return spring.

The preferred arrangement of parts consists of a pair of packing annuli sealing off between opposite sides of the plug stopper and the chamber wall of the valve body to prevent fluid flow through opposite flow passages leading into and out of the chamber when the stopper is in flow blanking relation with the passages and also when the stopper is displaced out of such relation, and a pair of packing actuators extending at opposite sides of the stopper and urged by a pair of return springs into engagement with a pair of like cams on the stopper shaft and trunnion.

A single packing annulus located on the down stream side of the valve and encircling a flow passage is capable of performing all of the necessary sealing functions. However, the direction of fluid flow through a valve may sometimes be reversed and in order to adapt the valve for universal application two packing annuli are preferably employed.

When the valve stopper of the present invention is closed against a relatively high differential pressure, there will be an initial leakage of pressure between the stopper and body faces which encircle the flow passage located on the up-stream side of the valve. When this pressure comes into contact with the inner face of the first packing annulus it will normally be sufficient to overcome the hoop tension of the up-stream packing annulus and will then pass out into the valve chamber surrounding the stopper. The pressure within the valve chamber will then be exerted against the outer surfaces of the second or downstream packing annulus, with the result that it will press more tightly against the stopper and body faces to form an impervious seal about the downstream flow passage.

These and other features and objects of the invention, as well as the details of an illustrative embodiment, will be more fully understood from the following detailed description of the drawings, in which.

Figure 1:
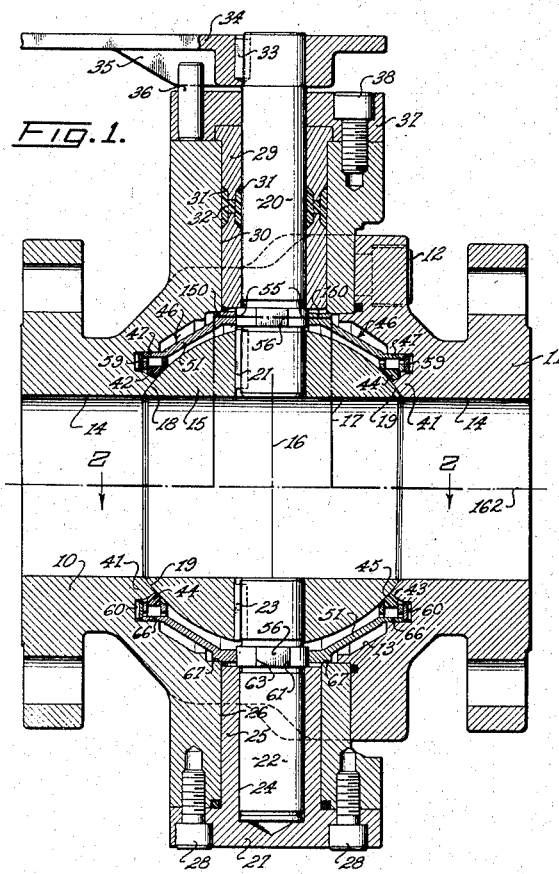
Fig. 1 is a vertical section taken through the valve assembly.
Figure 2:
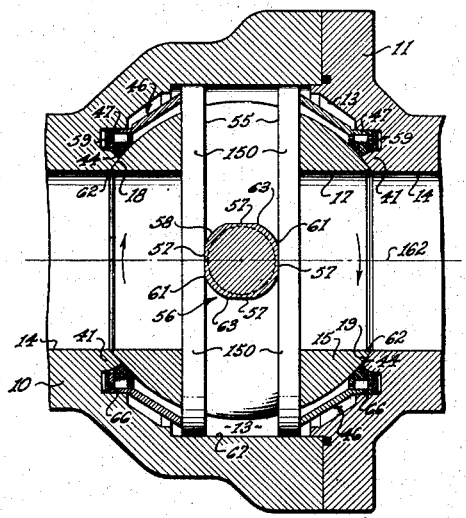
Fig. 2 is a horizontal section taken on line 2—2 of Fig. 1, showing the valve in fully opened condition.

As shown in Figs. 1 and 2, the assembly includes a flanged body 10 and a flanged body cap 11 connected by cap screws 12 and together forming a valve chamber 13 having co-axial inlet and outlet passages 14 for flowing fluid through the valve assembly. A stopper 15 in the general form of a spherical plug is positioned in the chamber for rotation therein about a vertical axis 16 extending transversely through a horizontal passage 17 in the stopper that is rotatable into and out of registration with horizontally extending chamber passages 14 for controlling fluid flow through the valve.

Although not shown, there is slight clearance between the stopper surface and the annular faces 18 and 19 of the body parts 10 and 11 so that the stopper may be freely turned inside the chamber 13 by rotation of a vertical spindle 20 to which it is keyed at 21. A trunnion 22 keyed to the stopper at 23 extends vertically thereabeneath and co-axially with the spindle with respect to axis 16, the spindle lower portion being mounted and centered within the bore 24 of a sleeve 25. The latter is in turn received within the vertical bore 26 of the body 10, and includes a flanged head 27 connected to the body by cap screws 28.

Figure 6:
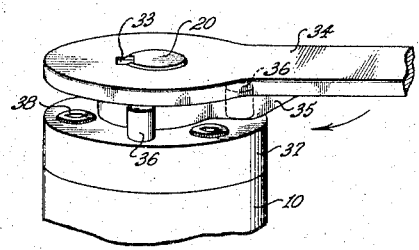
Fig. 6 is a perspective view of the valve top and handle.
Figure 7:
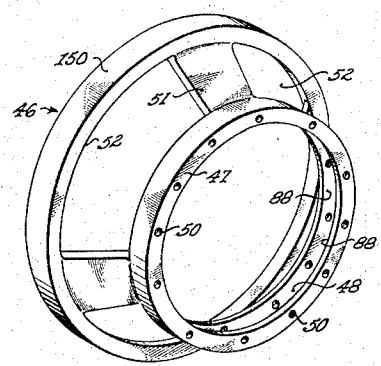
Fig. 7 is a perspective showing of the packing actuator used in the valve assembly.

Spindle 20 is centered by a bushing 29 received within a vertical bore 30 in the body 10 and containing a pair of annular recesses 31 filled with plastic packing 32 injected under pressure to seal off between the bushing, the spindle and bore 30. Keyed to the upper end of the spindle at 33 is a handle 34, which is manually rotatable so that the handle shoulder 35 moves between and into alternate engagement against the two stop pins 36, such alternate engagement corresponding to valve fully open and fully closed conditions. Extending the description to Fig. 6, the pins 36 are mounted in cover plate 37 connected by cap screws 38 with the body part 10, as shown.

Figure 5:
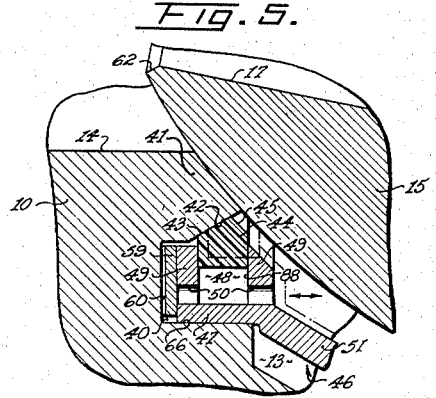
Fig. 5 is an enlarged fragmentary section illustrative of the bodily displaced condition of the packing during partly opened valve condition.
Figure 8:
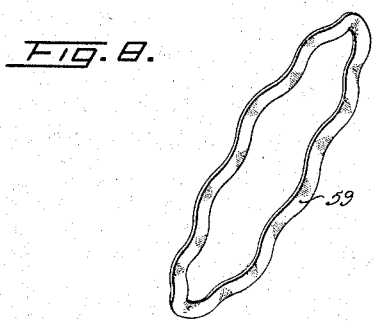
Fig. 8 is a perspective illustration of a bowed flat spring used in the valve assembly.

Referring now to Figs. 1 and 5, the body parts 10 and 11 form two annular cavities 40 extending circumferentially about the mouths of passages 14 and radially separated therefrom by annular portions 41 of these body parts. The radially inward, frustro-conical wall 42 of each cavity is engaged by the correspondingly frustro-conical surface 43 of annular packing 44, which in Fig. 5 is shown as being bodily laterally displaced along inclined face 42 away from the outer surface of the stopper 15. As mentioned in the introduction, the packing preferably comprises relatively stiff, internally tenacious sealing material, such as molded tetrafluoroethylene or rubber.

Due to the frustro-conical configuration of wall 42, the packing annulus 44, as illustrated in Fig. 5, is radially and circumferentially expanded when the sealing face 45 of the packing is laterally displaced from the stopper surface; however, it will be understood that the combined stresses in the packing resulting from such displacement are sufficiently below the yield point of the material that it has the inherent capacity to contract into full sealing engagement against the stopper surface, under the conditions that will be described. As shown in Fig. 5, packing faces 43 and 45 form a V-shaped angle.

Such bodily displacement of the packing is under the control of an actuator 46 that includes a relatively smaller ring-shaped portion 47 forming a channel 48 opening radially inwardly toward and receiving the annular packing in spaced relation to the inner surface 88 of the channel, the packing surfaces 43 and 45 projecting outside the ring 47 and channel 48. Extending through the horizontally spaced channel sides or webs 49 are drilled passages 50 through which fluid may pass from cavity 40 through channel 48 outside the packing 44 and then into the chamber 13, or vice versa, during opening and closing of the valve in order to mitigate any pressure differentials that might otherwise develop.

Further in connection with the description of the actuator 46, it also includes a relatively larger ring-shaped portion 150 laterally spaced from ring portion 47 and interconnected in co-axial relation therewith by segments 51 forming the passages 52 through which fluid is adapted to flow for pressure equalization purposes. The two actuators 46 extend in the chamber 13 in closely spaced surrounding relation with symmetrically opposed zonal surface portions of the stopper, so as to minimize the size of the valve assembly.

Facing and engaging the opposed surfaces 55 of the actuators are a pair of like cams 56 formed respectively on the spindle 20 and trunnion 22. The cams are better shown in Figs. 2 through 4 to include two pairs of diametrically opposed flats 57, each opposed pair being rotated 90° from the other and all of the flats being of the same size and sunk into cylindrical surface 58 of the cam. Continuous engagement of the actuator surfaces 55 against the cams is assured by a pair of substantially annular bowed springs 59, each of which extends in one of the cavities 40 between the actuator and the interior cavity face 60.

Immediate lateral bodily displacement of the actuators and the packings in opposite directions away from the stopper surface upon rotation of the spindle 20 by handle 34 is effected as a result of the particular illustrated shaping of the cams, the criticality of which is based upon the substantial angularity between tangents to the flats 57 and cylindrical surfaces 58 intersecting at vertical engagement edges 61 and 63.

Figure 3:
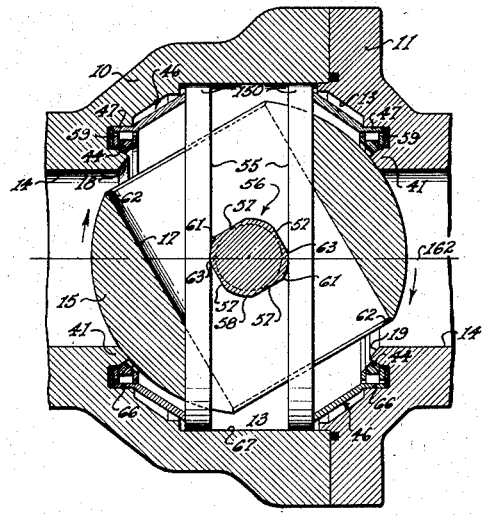
Fig. 3 is a view similar to Fig. 2 showing the valve in partly opened condition.
Figure 4:
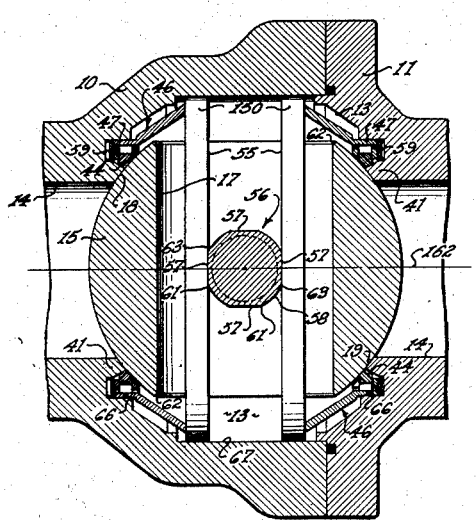
Fig. 4 is another view similar to Fig. 2 showing the valve in closed condition.

Considering the operation of the valve in connection with Figs. 2 through 4, upon commencing clockwise rotation of the handle 34 the opposite cam edges 61 immediately begin to displace the actuators, moving the packings bodily away from the stopper surface, and after which cam surfaces 58 and edges 63 continue to hold them away, so that by the time the beveled annular edges 62 forming the opposite mouths of passage 17 have traversed flow passages 14 and chamber wall portions 18 and 19, and begin to move opposite the packings, the latter still remain bodily displaced therefrom. Maximum bodily displacement of the packings away from the stopper surface is reached when the cam edges 61 traverse the horizontal axis 162 of passages 14, and the packings remain in this condition until the opposite cam edges 63 cross axis 162.

A study of Fig. 3 will show that the stopper mouth edges 62 will cross opposite the packings immediately after cam edges 63 cross the horizontal axis 162; however, the packings will not be retracted into engagement with the stopper surface until well after the edges 62 have passed opposite the packings. Therefore, there is no chance for the latter to be worn away by the stopper mouth edges 62.

A further advantage of so moving the packing bodily away from the stopper will be made apparent by referring particularly to Fig. 3. Assuming that the stopper has been rotated clockwise to the position shown and that fluid is passing through the restricted port opening at high velocity, there will exist under these conditions zones of high differential pressure adjacent the faces 18 and 19. It is therefore important that the plastic sealing material be kept back out of these zones of high differential pressure as otherwise there would be a tendency for the plastic material to be displaced or extruded from a high pressure zone into a low pressure zone. Displacement of the material is prevented by keeping the plastic material spaced somewhat below or outwardly offset from the planes of faces 18 and 19 during the periods in which the stopper is in such critical positions as the valve is opened and closed.

Packing retraction into pressure engagement with the stopper occurs not only as a result of the action of the springs 59 upon the actuators 46, but also by virtue of radial contraction of the expanded packings from self-energized expanded condition. Thus, when the stopper is in fully open or fully closed condition, as shown in Figs. 2 and 4, the packings remain under sufficient radial tension to cause them to press against the stopper surfaces and also against the frustro-conical surfaces 42 of the bodies 10 and 11 providing an initial sealing contact therebetween even without the aid of the spring force. A tighter sealing contact of the downstream packing is effected by virtue of fluid pressure in the valve chamber exerted against the outer circumferential surface of the annulus, thereby aiding its natural and spring urged contraction into pressure sealing annular contact with the stopper and the wall 42.

Guiding of the actuators 46 during their bodily displacement by the springs and packings, and by the cams, results from engagement of the outer surfaces of rings 47 and 150 against the cylindrical surfaces 66 and 67 of the cavity 40 and chamber 13 respectively.

I claim:
1. An improved valve assembly comprising body means forming a valve chamber and opposite flow passages having mouths opening into said chamber, said means including a frustro conical and annular wall projecting toward said chamber about one of said mouths and providing an annular valve seat facing said chamber, a valve stopper having a generally spherical surface rotatable in the chamber in close fitting relation with said seat and having a through bore movable into and out of flow passing relation with said one mouth, a resilient packing annulus encircling said wall and seat in elastic sealing engagement with annular surface portions of the stopper and wall when the stopper is out of flow passing relation with said one mouth, said packing annulus being bodily displaced relative to and upon said wall surface portion to a position of retraction away from the stopper surface during periods of stopper rotation, the clearance between the stopper surface and said packing annulus in its retracted position being greater than the clearance between the stopper surface and said seat, and other means including a packing actuator operable to so displace said packing annulus in response to stopper rotation.

2. The invention as defined in claim 1 in which said other means includes a cam rotatable with the stopper to displace said actuator away from the stopper.

3. The invention as defined in claim 2 in which said actuator is carried by said body means for movement toward and away from said stopper.

4. The invention as defined in claim 3 in which said body means forms an annular cavity receiving said packing.

5. The invention as defined in claim 4 including a spring in said cavity urging said packing toward the stopper.

6. The invention as defined in claim 5 comprising an elastomer packing.

7. The invention as defined in claim 5 comprising tetrafluoroethylene packing.

8. The invention as defined in claim 5 in which said frustro conical wall reduces in diameter toward the stopper.

9. The invention as defined in claim 8 in which said packing is in radially expanded condition seeking to move toward the stopper along said wall surface portion at times when the packing is bodily displaced away from the stopper.

10. The invention as defined in claim 9 in which said annular surface portions of the stopper and body wall form an annular V-shaped groove.

11. The invention as defined in claim 4 in which said stopper has a stem mounting said cam and said actuator includes an annular ring holding said packing annulus in said cavity and a part in engagement with said cam.

12. An improved valve assembly comprising body means forming a valve chamber and opposite flow passages having mouths opening into said chamber, said means including opposite frustro conical and annular walls projecting toward said chamber about said mouths and providing annular valve seats facing said chamber, a generally spherical valve stopper rotatable in the chamber in close fitting relation with said seats and having a through bore movable into and out of flow passing relation with said mouths, a pair of resilient packing annuli encircling said walls and seats in elastic sealing engagement with annular surface portions of the stopper and said walls when the stopper is out of flow passing relation with said mouths, said packing annuli being bodily displaced relative to and upon said wall surface portions to positions of retraction away from the stopper surface during periods of stopper rotation, the clearance between the stopper surface and each packing annulus in its retracted position being greater than the clearance between the stopper surface and said seat, and other means including a pair of packing actuators operable to so displace said packing annuli in response to said stopper rotation.

13. The invention as defined in claim 12 in which said actuators are carried by said body means for movement toward and away from said stopper.

14. The invention as defined in claim 13 in which said other means includes a cam rotatable with the stopper between said actuators to displace them simultaneously away from said stopper.

15. The invention as defined in claim 14 in which reduced lift portions of the cam engage the actuators and said annuli again seal off between said walls and stopper at a time when the stopper has been rotated into flow passing relation with said passages.

16. The invention as defined in claim 15 in which said cam has a pair of diametrically opposed flats engaging said actuators and another pair of diametrically opposed flats extending at approximately 90 degrees from said first pair about the axis of cam rotation.

17. An improved valve assembly comprising body means forming a valve chamber and opposite flow passages having mouths opening into said chamber, said means including an annular wall projecting toward said chamber about one of said mouths and providing an annular valve seat facing said chamber, said body means forming an annular cavity extending about said wall, a valve stopper having a generally spherical surface rotatable in the chamber in close fitting relation with said seat and having a through bore movable into and out of flow passing relation with said one mouth, a resilient packing annulus in said cavity encircling said wall and seat in elastic sealing engagement with annular surface portions of the stopper and wall when the stopper is out of flow passing relation with said one mouth, said packing annulus being bodily displaced relative to and upon said wall surface portion to a position of retraction away from the stopper surface during periods of stopper rotation, the clearance between the stopper surface and said packing annulus in its retracted position being greater than the clearance between the stopper surface and said seat, and other means including a packing actuator operable to so displace said packing annulus in response to stopper rotation, said actuator including a ring holding said packing annulus in said cavity, the clearance between said ring and the stopper surface being greater than said clearance between the stopper surface and said packing annulus.

References Cited in the file of this patent
UNITED STATES PATENTS 2,718,372    Broz _____ Sept. 20, 1955

FOREIGN PATENTS 146,097    Germany _____ June 10, 1936